United States Patent
Asiala, Jr. et al.

(10) Patent No.: US 11,441,309 B1
(45) Date of Patent: Sep. 13, 2022

(54) WALL SYSTEM

(71) Applicant: Signature Wall Solutions, Inc., Midland, MI (US)

(72) Inventors: Wiljo E. Asiala, Jr., Midland, MI (US); Kenneth Staten, Clare, MI (US)

(73) Assignee: Signature Wall Solutions, Inc., Midland, MI (US)

( * ) Notice: Subject to any disclaimer, the term of this patent is extended or adjusted under 35 U.S.C. 154(b) by 0 days.

(21) Appl. No.: 17/702,950

(22) Filed: Mar. 24, 2022

Related U.S. Application Data

(60) Provisional application No. 63/166,292, filed on Mar. 26, 2021.

(51) Int. Cl.
| | |
|---|---|
| *E04B 1/61* | (2006.01) |
| *E04C 2/20* | (2006.01) |
| *C08J 9/36* | (2006.01) |
| *C08J 9/34* | (2006.01) |
| *E04C 2/04* | (2006.01) |
| *E04B 2/00* | (2006.01) |
| *E04C 1/40* | (2006.01) |
| *E04C 1/39* | (2006.01) |
| *E04C 2/02* | (2006.01) |

(Continued)

(52) U.S. Cl.
CPC ............... *E04B 1/6125* (2013.01); *C08J 9/34* (2013.01); *C08J 9/365* (2013.01); *E04B 2/00* (2013.01); *E04C 1/39* (2013.01); *E04C 1/40* (2013.01); *E04C 2/02* (2013.01); *E04C 2/049* (2013.01); *E04C 2/205* (2013.01); *E04C 2/46* (2013.01); *C08J 2205/10* (2013.01); *C08J 2207/00* (2013.01); *C08J 2325/06* (2013.01); *E04B 2002/0202* (2013.01); *E04C 2002/004* (2013.01)

(58) Field of Classification Search
CPC .. E04B 1/6125; E04B 2/00; E04B 2002/0202; E04B 1/6116; E04C 1/39; E04C 1/40; E04C 2/02; E04C 2/049; E04C 2/205; E04C 2/46; E04C 2002/004; E04C 2/292
See application file for complete search history.

(56) References Cited

U.S. PATENT DOCUMENTS 5,165,816 A * 11/1992 Parasin .................. F16B 5/0012
  52/592.4
5,348,778 A * 9/1994 Knipp ..................... E04C 2/292
  428/318.6

(Continued)

*Primary Examiner* — Patrick J Maestri
(74) *Attorney, Agent, or Firm* — Harness, Dickey & Pierce, P.L.C.

(57) ABSTRACT

A wall panel includes a first and second planar skins and a core disposed therebetween. A first and second lateral edge extends between the skins. The second lateral edge comprises a female receiver. The first lateral edge comprises a male extension extending therefrom. The female receiver is formed in the core and has a depth equal to or greater than a length of the male extension. The male extension is formed from the core comprises a first parallel surface extending parallel to and offset from the first planar skin and a second parallel surface extending parallel to and offset from the second planar skin. A first tapered portion comprises a first tapered surface extending at an angle relative to a longitudinal axis from the first parallel surface to a rounded end, and a second tapered surface extending at the angle from the second parallel surface to the rounded end.

20 Claims, 4 Drawing Sheets

(51) Int. Cl.
*E04B 2/02* (2006.01)
*E04C 2/00* (2006.01)

(56) References Cited

U.S. PATENT DOCUMENTS

| | | | | |
|---|---|---|---|---|
| 6,098,365 | A * | 8/2000 | Martin | E04B 1/6125 |
| | | | | 52/592.4 |
| D497,008 | S * | 10/2004 | Germany | D25/113 |
| 8,646,242 | B2 * | 2/2014 | Shapiro | E04F 15/10 |
| | | | | 52/741.1 |
| 9,809,084 | B2 * | 11/2017 | Grieb | B60H 1/00528 |
| 10,246,873 | B1 * | 4/2019 | Costanza | B32B 9/007 |
| D898,952 | S * | 10/2020 | Spear | D25/138 |
| 2016/0194865 | A1 * | 7/2016 | Chou | A47B 96/205 |
| | | | | 52/745.05 |
| 2016/0288447 | A1 * | 10/2016 | Cordeiro | B32B 9/047 |
| 2019/0226204 | A1 * | 7/2019 | Visser | E04B 1/615 |
| 2021/0115668 | A1 * | 4/2021 | Lee | C04B 28/30 |
| 2022/0056692 | A1 * | 2/2022 | Romans | E04C 2/30 |

\* cited by examiner

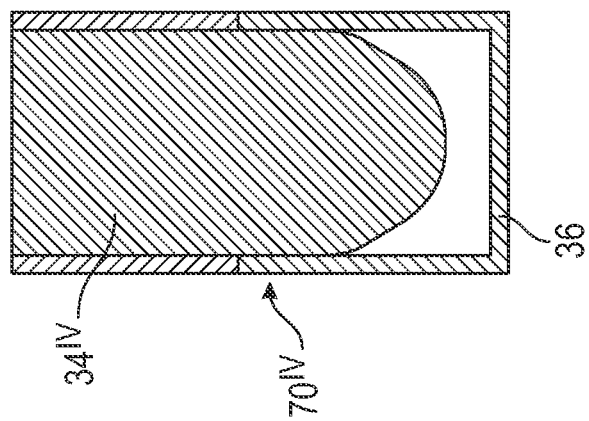
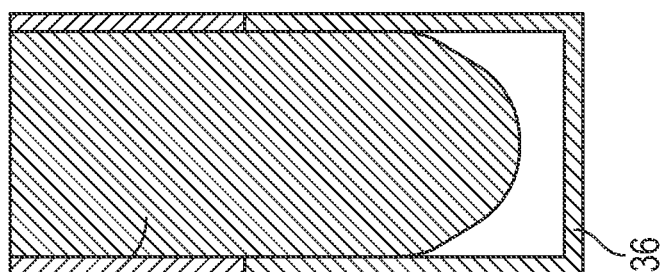
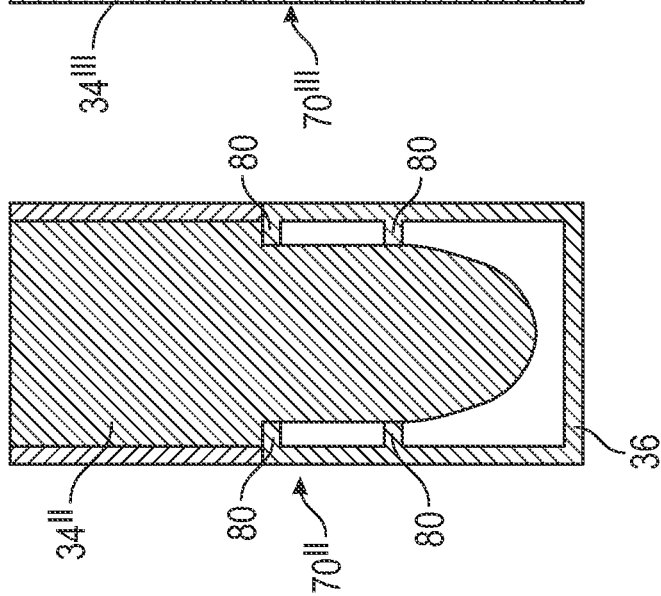
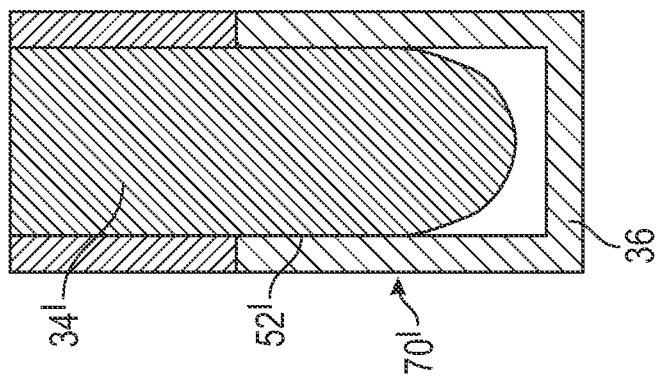

WALL SYSTEM

CROSS-REFERENCE TO RELATED APPLICATION

This application claims the benefit of U.S. Provisional Application No. 63/166,292, filed on Mar. 26, 2021. The entire disclosure of the above application is incorporated herein by reference.

FIELD

The present disclosure relates generally to wall systems and, more particularly, to wall systems that have panels that are easy to assemble and disassemble.

BACKGROUND

Temporary and permanent wall systems have been in use for many years. Wall systems that are reusable are used in many industries. Temporary wall systems may be used to separate an area under construction from an area that is still used by customers. The wall systems separate dirt and noise associated with a construction area with the portions of the structure that are still in use. Temporary wall systems can also be used to reduce an amount of floor area heated and cooled in a larger structure, while allowing expansion when needed. Separately formed joiners are required. The joiners are formed separately and are fastened to the edge of the wall. Known wall systems use high density joiners at the seams. For example, aluminum joiners are used. Separately formed joiners add time and cost to the system.

SUMMARY

The ability to reliably assemble and disassemble a wall system and have the wall system look aesthetically pleasing is important. Reusing wall components and using less materials is environmentally suitable and cost-effective. The present system is backward compatible with previous wall systems while overall reducing the amount of materials used to form the panels and joiners.

In one aspect of the disclosure, a wall panel includes a first and second planar skins and a core disposed therebetween. A first and second lateral edge extends between the skins. The second lateral edge comprises a female receiver. The first lateral edge comprises a male extension extending therefrom. The female receiver is formed in the core and has a depth equal to or greater than a length of the male extension. The male extension is formed from the core comprises a first parallel surface extending parallel to and offset from the first planar skin and a second parallel surface extending parallel to and offset from the second planar skin. A first tapered portion comprises a first tapered surface extending at an angle relative to a longitudinal axis from the first parallel surface to a rounded end, and a second tapered surface extending at the angle from the second parallel surface to the rounded end.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

FIGS. 4A-4D are alternative cross sections of the male portions and female portions of a joint.

DETAILED DESCRIPTION

Example embodiments will now be described more fully with reference to the accompanying drawings.

In the present disclosure, separate joiners have been eliminated by using the core as a joiner. As is described herein, the core is a foam material strong enough to reduce damage during the assembly and disassembly process while being lightweight.

Figure 1:
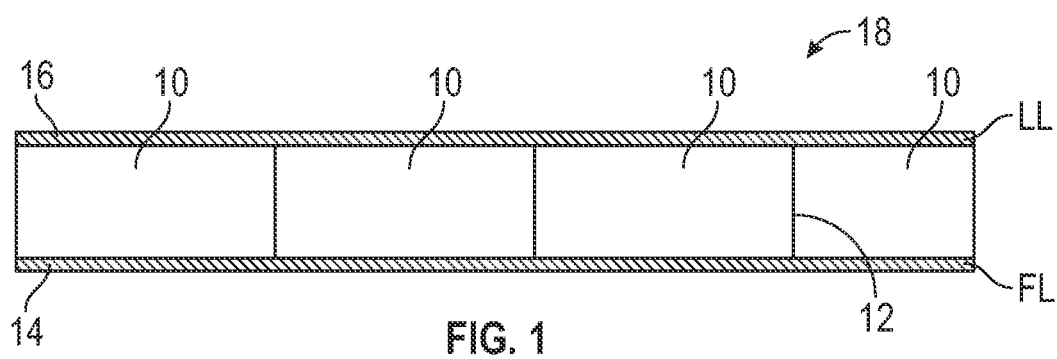
FIG. 1 is a front view of a plurality of assembled wall panels.

Referring now to FIG. 1, a plurality of assembled wall panels 10 are illustrated. The wall panels 10 have seams 12 that are formed between adjacent wall panels 10. The seams 12 are hardly noticeable when the panels 10 are assembled when the same finishing materials are used. The wall panels 10 when assembled rest on the floor at the floor line FL or within a channel or lower track 14 An upper track 16 may receive an upper edge of the wall panels 10. The upper track 16 is fastened to the building structed of ceiling denoted by ceiling line CL. The lower track 14 and the upper track 16 allow the wall panels 10 that are formed into a wall panel assembly 18 to be fixed into a position relative to the building that is both easy and quick to assemble and disassemble.

The wall panels 10 may be various sizes. In a commercial example, the lengths may be standardized such as 4 feet, 8 feet, and 16 feet, although another length can be used. The seams 12 may also vary in length. The seams 12 run the height of the wall panel assembly 18. For example, 2 foot to 16 foot high panels may be used. Facilitating the joining and separation of these components to increase reusability in the shape of the design is desirable.

Figure 2A:
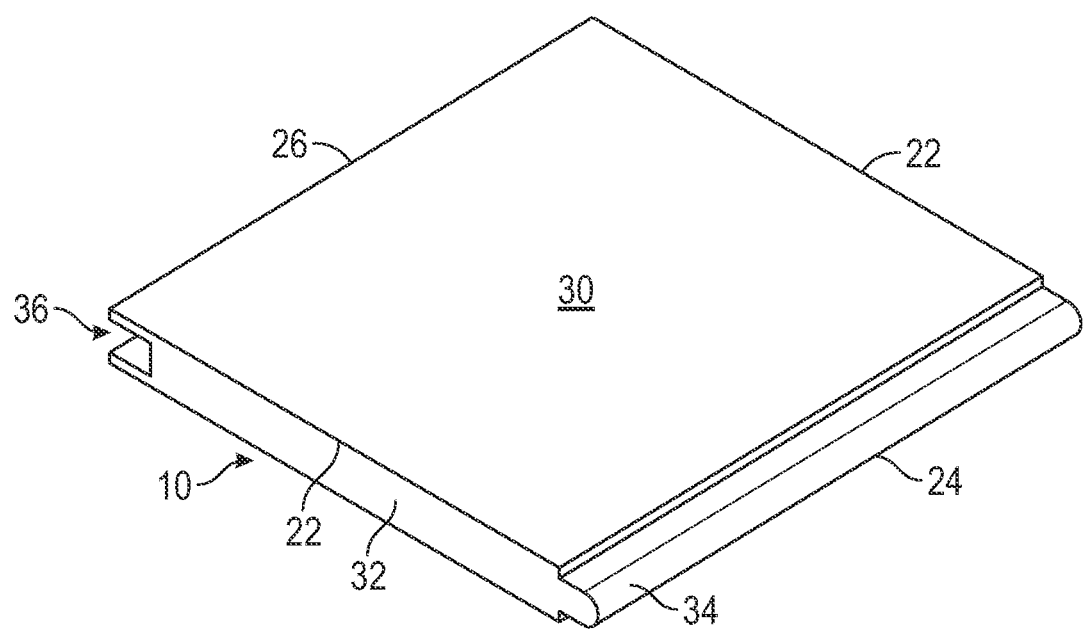
FIG. 2A is a perspective view of a wall panel formed according to the present disclosure.
Figure 2B:
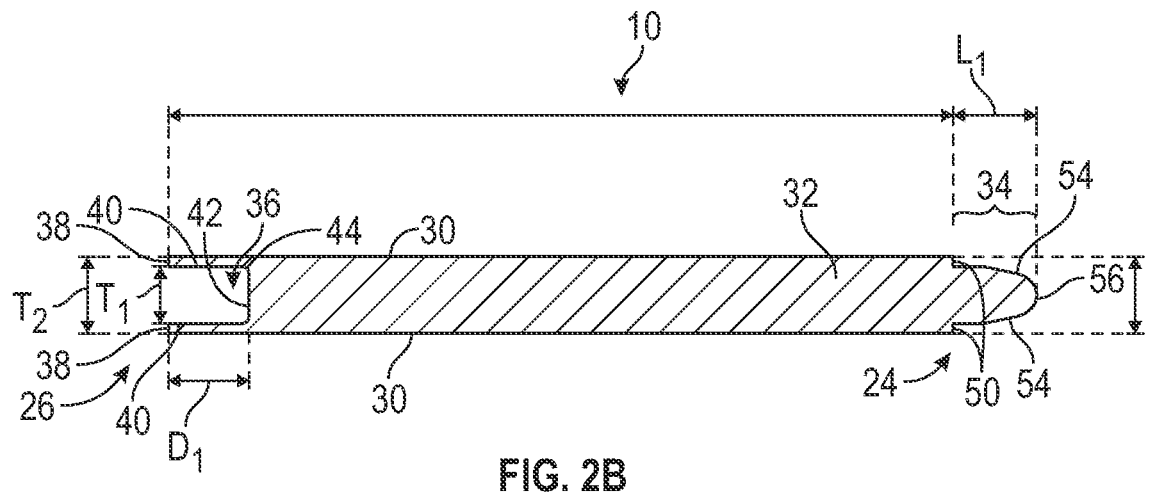
FIG. 2B is a cross-sectional view of the wall panel of FIG. 2A.
Figure 2C:
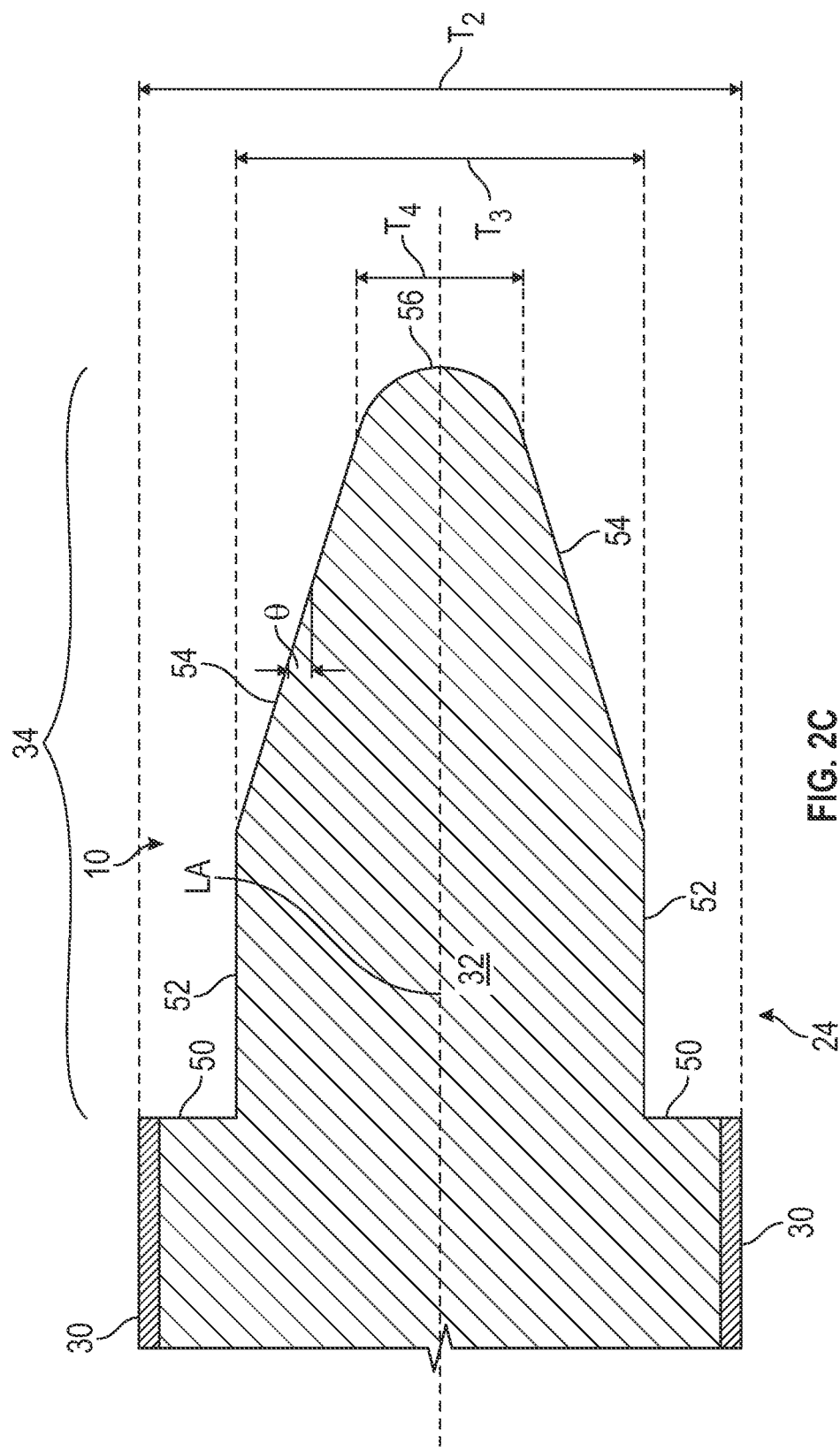
FIG. 2C is a side exaggerated view of the male extension of the wall panel of FIG. 2B.

Referring now to FIGS. 2A, 2B and 2C, a wall panel 10 is illustrated in further detail. The wall panel 10 has longitudinal edges 22 that are received in respective tracks 14, 16 when installed. The longitudinal edges 22 are parallel to a wall and ceiling of the building. A first lateral edge 24 and a second lateral edge 26 extend between the longitudinal edges 22. The first lateral edge 24 and the second lateral edge 26 are disposed vertically when assembled and form corners with respective longitudinal edges 22. In the present example, the wall panels 10 are a rectangular solid, in general, with modified lateral edges 26, 26.

The panel 10 comprises two planar outer skins 30 and a foam core 32 disposed therebetween. The planar wall skins 30 may be formed of acrylonitrile butadiene styrene (ABS) or another type of polymer. The skins 30, in a constructed example, had a density about 1.07 g/cm$^3$+/−0.1 g/cm$^3$. The skins 30 may also be formed of metal sheets such as aluminum. The skins 30, in the constructed example, are between about 0.3 and about 0.9 inches thick. In this example, the outer skins 30 on each of the wall surfaces have a finished look with high durability. Graphics may be applied to the planar outer skins 30 for decorative and informative purposes. The surface may also be easily cleaned.

Between the skins 30 of the wall panel 10 is the high-density foam core 32. The high-density foam core 32, in constructed examples, has a density of about 2 to about 4 lbs/ft³. In the present example, expanded polystyrene (EPS) was used, although other suitable materials may be used. Other examples include but are not limited to isocyanurates, polyethylene and urethanes. The thickness T2 of the wall panel 10 including the outer skins 30 and the foam core 32 in the constructed example is between about 1.070 inches and about 1.125 inches. However, other thicknesses and relative thicknesses may be used.

The first lateral edge 24 may be referred to as a male edge and has an extension 34 extending therefrom. The extension 34 may be continuous along the first lateral edge 24. However, the male extension 34 may be formed discontinuously in sections as well. The high-density foam core 32 is machined, e.g., routered, to form the male extension 34.

The second lateral edge 26 may be referred to as a female edge and has a female opening, channel or female receiver 36 formed therein. The high-density foam core 32 is machined, e.g., routered, to form the female receiver 36 that, in this example is generally rectangular in shape. The male extension 34 of one panel is received in the female opening or female receiver 36 of the adjacent panel to form the wall panel assembly 18. In the present example, the female receiver 36 is about 0.75 inches in thickness T1. The remaining thickness T2 of the wall panel 10 corresponds to female hips 38 disposed on each side of the female receiver 36. In this example the difference of T2-T1 is split evenly between the two female hips. The female receiver 36 extends longitudinally into the high-density foam core 32 a distance or depth D1 to accommodate the male extension 34. The depth D1 may be equal to or slightly larger (deeper) than the male extension 34. The female receiver 36 has longitudinally extending sides 40 that are parallel to and may include the skins 30 and a lateral side 42 that is perpendicular to the outer surface or skin 30. A radius 44 is machined between each of the longitudinal sides 40 and the lateral side 42. It has been found that the use of the radius 44 increases the strength of the joint.

Referring now specifically to FIG. 2C, the male extension 34 (or bullnose) is illustrated. In FIG. 2C, the male extension 34 has the different surfaces exaggerated and separated for explanatory purposes only. The skins are also illustrated in exaggerated form.

The male extension 34 has an overall thickness T3 that is less than the thickness T2 of the wall panel 10. The male extension 34 is formed adjacent to two male hips 50 that extend in a perpendicular direction to the surface or outer skin 30. The sum total length of the hips 50 is about 29% to 32% of the overall thickness of the panel. That is, when the length of the two male hips 50 are added together in the present example, the sum of the hips 50 are between about 0.31 inches and 0.342 inches. In this example, the hips 50 are centered so each hip is about 0.155 inches and about 0.171 inches.

Adjacent to the hips 50, a pair of parallel surfaces 52 extend perpendicularly to the hips 50. The parallel surfaces 52 are also parallel to and offset from the outer skin 30. The length of the parallel surfaces 52 are about ¼ to ⅓ of the length of the male extension which, in this example, is about 1.0625 inches (0.2656 inches to 0.3542 inches).

Adjacent to the parallel surfaces 52 are tapered surfaces 54. The tapered surfaces 54 are planar or flat surfaces that start at the parallel surface 52 and end at a rounded end 56. The tapered surfaces 54 form an angle θ between about 20 degrees and about 30 degrees relative to the outer skin or the longitudinal axis LA of the panel 10.

The rounded end 56 is a portion of a circle (or cylinder when extended along the length of lateral edge as shown in FIG. 2A) that has a thickness T4 illustrated best in FIG. 2C. The thickness T4 (or width) of the rounded end 56 is between about 55% and 70% of the female opening. The reduced thickness T4 of the rounded end 56 assists in the assembly of the panels. Having the thickness of the rounded end 56 between about 55% and about 70% of the thickness T1 female receiver 36 allows the rounded end to be easily inserted within the female receiver 36 and the male extension 34 to insert fully into the female receiver 36. Another way to describe the rounded end 56 is between about 38.5% to about 50% of the total wall thickness T2. The tapered surfaces 54 extend from the rounded end 56 to the parallel surfaces 52. The tapered surfaces 54 are tangential to two locations of the rounded end 56. The dimensions of the tapered surface 54 and the rounded end 56 may vary.

By providing a sufficient length of the parallel surfaces 52, the stability of the wall panel assembly 18 is increased. The parallel surfaces 52 are disposed against the longitudinally extending sides 42 of the female receiver 36 when assembled. The distance between the parallel surfaces (the thickness T3) is about 1.5% to about 3.5% less than the female opening, which in this example is 0.75 inches. This allows easy assembly and allows for manufacturing tolerances.

The variance in materials and the variance inherent in lower density materials required a different fit than traditional hard surfaces alone. The special shape disclosed above allows joinability even during variability in the material. The shape of the joiner face allows fitting two or more panels that may be as low as 2 ft high and as tall as 16 ft high. Different lengths of the seams are required to fit together with equal appearance and performance. The clearances are important on softer materials such as the high-density foam of the present disclosure rather than prior metal joiners. Softer materials and also deformable materials may be crushed in one place or broken during storage, installation or removal. There is therefore a greater dependence on the remaining joint or seam to perform and align the panels.

The present design alignment along a very long surface like 16-foot panels even if a portion is missing from the joint. This is especially important during insertion when bringing these panels together and when they are seated for overall appearance.

Softer and less dense materials require consideration for fit. If the materials are too thick in different places along the panel, then the panels will not seat together. If the material is too thin, then it can be broken easily or result in poor alignment when seated. Materials without joiners can vary considerably in thickness throughout the panels and therefore require a certain design to allow for alignment and for the panel to be fungible with other panels of any orientation.

Figure 3A:
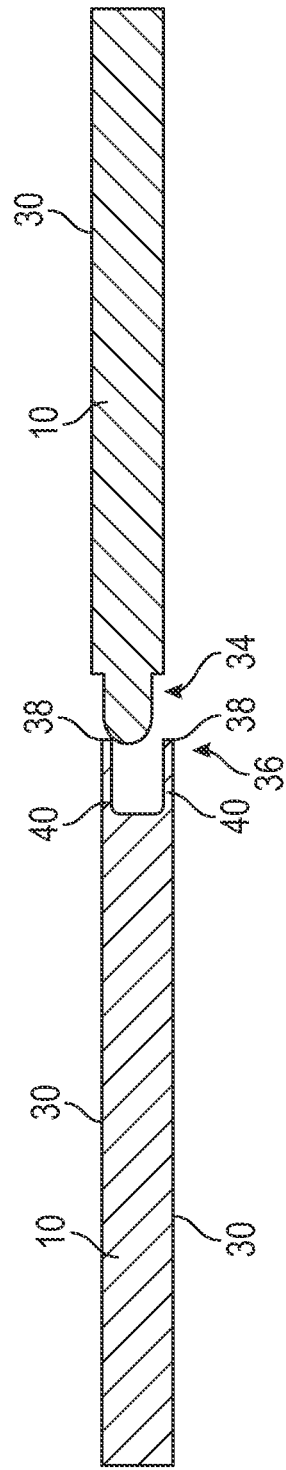
FIG. 3A is a cross sectional view of two wall panels joined together.
Figure 3B:
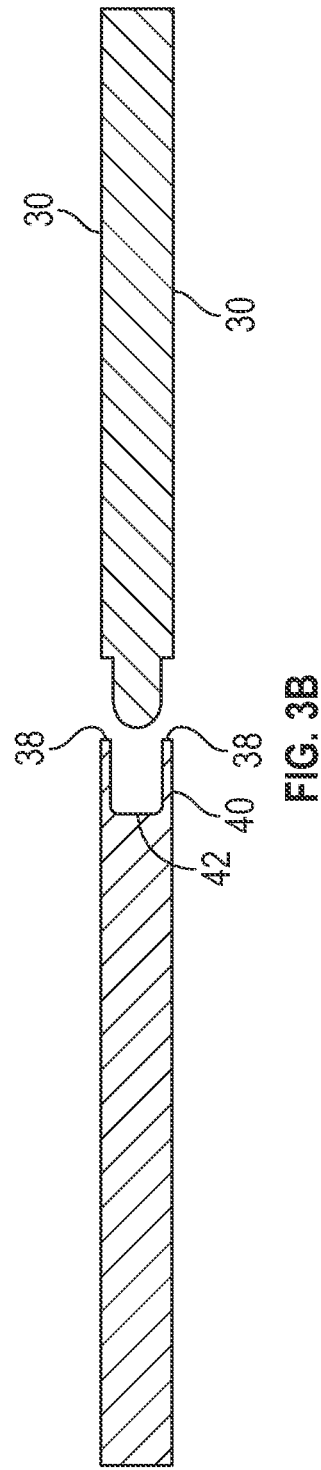
FIG. 3B is a cross sectional view of two wall panels joined being together.
Figure 3C:
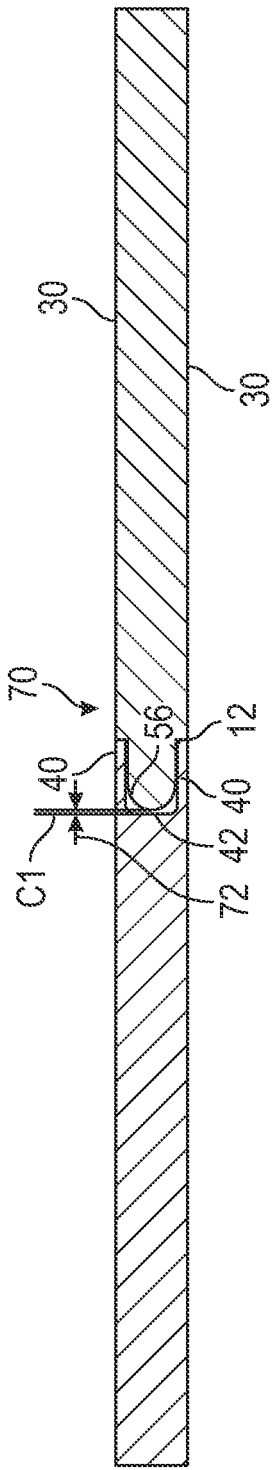
FIG. 3C is a cross sectional view of two wall panels being joined together with misalignment.

Referring now also to FIGS. 3A-3C, cross sectional views of the assembly process for two adjacent wall panels 10 of the wall panel assembly 18 is illustrated. The male extension 34 and the female receiver 36 form a joint 70 when assembled as shown in FIG. 3C. The male extension 34 is received by the female receiver 36 to assist in maintaining the wall in a predetermined position. Each end of the wall panel 10 may have either the male extension 34 or a female receiver 36. A seamless look is created when two adjacent wall panels 10 are assembled and the adjacent surfaces are nearly flush. The female receiver 36 or the receiver end of the wall panel 10 receives the male extension 34 or male end of the wall panel. The male extension 34 is shaped to allow the panels to be easily assembled even though a slight misalignment occurs and best illustrated in FIGS. 3A and 3B. The male extension 34 may also be referred to as a bullnose. FIG. 3C shows about a 0.063 inch gap 72 or clearance (C1) between the rounded end 56 of the male extension 34 and the lateral side 42 of the female receiver 36. When assembled the female hips 38 are adjacent to the female hips 50 and the parallel surfaces 52 are adjacent to the longitudinally extending sides 40 of the female receiver 36

Referring now to FIGS. 4A-4D, a plurality of joints $70^I$, $70^{II}$, $70^{III}$ and $70^{IV}$ between two panels having different geometries is illustrated. In FIG. 4A, proportionally longer parallel surfaces $52^I$ of the male extension $34^I$ are illustrated. In FIG. 4B, four extensions 80 within the female receiver 36 contact the male extension $34^{II}$. In FIG. 4C, the proportions of the male extension $34^{III}$ are altered with more angular tapered sides $54^I$. Likewise, in FIG. 4D, the proportions of the male extension $34^{IV}$ are altered. That is, between FIGS. 4C and 4D, the length of the male extensions $34^{IV}$ are reduced compared to extension $34^{III}$.

To manufacture the systems, the female openings may be machined by a router or joiner. The male extension may be formed by a special shaped router or bit in a continuous manufacturing operation. The skin may be applied prior to the formation of the female opening and the male extension.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The term "about" in the previous description corresponds to manufacturing tolerances at standard room temperature of +/−4%.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below", or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A wall panel comprising:
   a first planar skin;
   a second planar skin;
   a core disposed between the first planar skin and the second planar skin;
   a first lateral edge extending between the first planar skin and the second planar skin;
   a second lateral edge extending between the first planar skin and the second planar skin parallel to the first lateral edge, the second lateral edge comprises a female receiver disposed therein;
   the first lateral edge comprises a male extension extending therefrom, said female receiver is formed in the core and has a depth equal to or greater than a length of the male extension;
   the male extension formed from the core comprising a first parallel surface extending parallel to and offset from the first planar skin and a second parallel surface extending parallel to and offset from the second planar skin; and a first tapered portion comprising a first tapered surface extending at an angle relative to a longitudinal axis from the first parallel surface to a rounded end, and a second tapered surface extending at the angle from the second parallel surface to the rounded end.

2. The wall panel of claim 1 wherein the depth of the female receiver is less than the length of the male extension so that a gap is formed between a lateral wall of the female receiver and the male extension.

3. The wall panel of claim 2 wherein the female receiver is formed by the lateral wall and a pair of longitudinal walls, said lateral wall coupled each of the longitudinal walls with a radius.

4. The wall panel of claim 1 wherein said female receiver formed between a first female hip and a second female hip, said female receiver comprising a second thickness.

5. The wall panel of claim 4 wherein said first lateral edge comprising a first male hip disposed between the first planar skin and the male extension and a second male hip disposed between the second planar skin and the male extension.

6. The wall panel of claim 5 wherein the first female hip and the second female hip comprise a first thickness the same as or less than the first male hip and the second male hip.

7. The wall panel of claim 1 wherein a thickness of the female receiver is greater than or equal to a distance between the first parallel surface and the second parallel surface.

8. The wall panel of claim 1 wherein a thickness of the female receiver is between about 1.5 percent and 3.5 percent greater than a distance between the first parallel surface and the second parallel surface.

9. The wall panel of claim 1 wherein a thickness of the tapered portion is reduced between the first parallel surface and the second parallel surface and the rounded end.

10. The wall panel of claim 1 wherein the first tapered surface and the second tapered surface are disposed between 20 degrees and 30 degrees from a longitudinal axis of the wall panel.

11. The wall panel of claim 1 wherein the first planar skin and the second planar skin are composed of polymer.

12. The wall panel of claim 1 wherein the core is composed of a high-density foam.

13. The wall panel of claim 12 wherein the high-density foam is between 2 and 4 pounds per cubic feet.

14. The wall panel of claim 12 wherein the high-density foam is composed of expanded polystyrene.

15. The wall panel of claim 1 wherein the rounded end has a width of about 55 percent to 70 percent of a width of the female receiver.

16. The wall panel of claim 1 wherein the first parallel surface and the second parallel surface comprises a first length and the male extension comprises a second length, said first length is about 25 percent to about 33 percent of the second length.

17. The wall panel of claim 1 wherein the first parallel surface and the second parallel surface comprise a first length between about 25 percent and about 33 percent of a second length of the male extension.

18. A wall system comprising:
a plurality of wall panels formed according to claim 1;
wherein the male extension of a first wall panel of the plurality of wall panels is inserted into the female receiver of a second wall panel of the plurality of wall panels so that the male hips of the first wall panel are adjacent to female hips of the second wall panel.

19. A wall panel comprising:
a first planar skin;
a second planar skin;
a core disposed between the first planar skin and the second planar skin;
a first lateral edge extending between the first planar skin and the second planar skin;
a second lateral edge extending between the first planar skin and the second planar skin parallel to the first lateral edge, the second lateral edge comprises a female receiver disposed therein;
wherein the first lateral edge comprises a male extension extending therefrom, said female receiver is formed in the core and has a depth greater than a first length of the male extension and a first thickness greater than a second thickness of the male extension, said female receiver defined by a first longitudinal wall and a second longitudinal wall spaced apart by a lateral wall, said lateral wall coupled to the first longitudinal wall with a first radius and coupled to the second longitudinal wall with a second radius, said lateral wall and the male extension having a gap therebetween;
the male extension formed from the core comprising a first parallel surface extending parallel to and offset from the first planar skin and a second parallel surface extending parallel to and offset from the second planar skin; and
a first tapered portion comprising a first tapered surface extending at an angle relative to a longitudinal axis from the first parallel surface to a rounded end, and a second tapered surface extending at the angle from the second parallel surface to the rounded end.

20. The wall panel of claim 19 wherein the first parallel surface and the second parallel surface comprises a second length, said second length being about 25 percent to about 33 percent of the first length.

* * * * *